US006993244B2

(12) United States Patent
Kuo (10) Patent No.: US 6,993,244 B2
(45) Date of Patent: Jan. 31, 2006

(54) RADIAL TYPE LIGHT-GUIDING PLATE

(76) Inventor: Heng Huang Kuo, P.O. Box 26-757, Taipei 106 (TW)

( * ) Notice: Subject to any disclaimer, the term of this patent is extended or adjusted under 35 U.S.C. 154(b) by 252 days.

(21) Appl. No.: 10/277,236

(22) Filed: Oct. 18, 2002

(65) Prior Publication Data

US 2004/0075994 A1 Apr. 22, 2004

(51) Int. Cl.
*G02B 6/00* (2006.01)
*F21V 5/00* (2006.01)

(52) U.S. Cl. .................... 385/901; 362/217; 362/331
(58) Field of Classification Search ............... 385/115, 385/116, 120, 121, 146, 147, 901; 362/27, 362/31, 217, 330, 331, 560
See application file for complete search history.

(56) References Cited

U.S. PATENT DOCUMENTS 6,473,554 B1 * 10/2002 Pelka et al. ................. 385/146
6,554,440 B2 * 4/2003 Umemoto .................... 362/31
6,669,350 B2 * 12/2003 Yamashita et al. ........... 362/31
2002/0030650 A1 * 3/2002 Kawada et al. ............. 345/87

FOREIGN PATENT DOCUMENTS

JP 09-035518 * 2/1997
JP 2000-098382 * 4/2000

* cited by examiner

*Primary Examiner*—Frank G. Font
*Assistant Examiner*—Christopher M. Kalivoda
(74) *Attorney, Agent, or Firm*—Rosenberg, Klein & Lee (57) ABSTRACT

A radial type light-guiding plate comprises a light source, a light-guiding plate, and a reflective component. The top face of the light-guiding plate is a light output face, and the bottom face thereof is a reflective face. The light source is disposed at sides of the light-guiding plate. The reflective face has channels, which radiate toward the sides near the light source. Because the channels are radial, the reflected light rays in the range of the light-guiding plate near the light source will be less. The light emission near the light source thus will not be too bright. Because the channels of the light-guiding plate that are far from the light source are closer together, light rays can be effectively transmitted thereto to increase the brightness of light emission therefrom, hence letting the brightness of the whole light output face be more uniform.

4 Claims, 9 Drawing Sheets

RADIAL TYPE LIGHT-GUIDING PLATE

FIELD OF THE INVENTION

The present invention relates to a radial type light-guiding plate and, more particularly to a light-guiding plate, which converts a line light source into a plane light source to apply to flat panel light output devices like liquid crystal displays.

BACKGROUND OF THE INVENTION

Conventional display devices utilize the technique of electron beam to generate light rays and images on a curved or planar range. Limited by the characteristic requirement of electron beam, picture tubes of the conventional display devices are bulky. Therefore, the newest development direction aims to shrink the volume of display device. Display devices integrated with the technique of light-guiding plate start to develop vigorously. For instance, the disclosure of liquid crystal TVs provides a way of saving space in increasingly confined living and working environments of people. The popularization of notebook computers also depends on their greatly reduced weight and compact size. Moreover, improvement in the weight and volume of electronic billboards lets visions and advertisements are more beautiful and diversified. All the above improvements rely on the miniaturization of display panels, wherein light-guiding plates play an important role for effectively changing the usage of light source. Therefore, how to utilize the characteristic of light rays to let everywhere of a light-guiding plate (especially places far away from the light source) have sufficient and uniform brightness is an important direction of improving the light-guiding plate structure.

Figure 1:
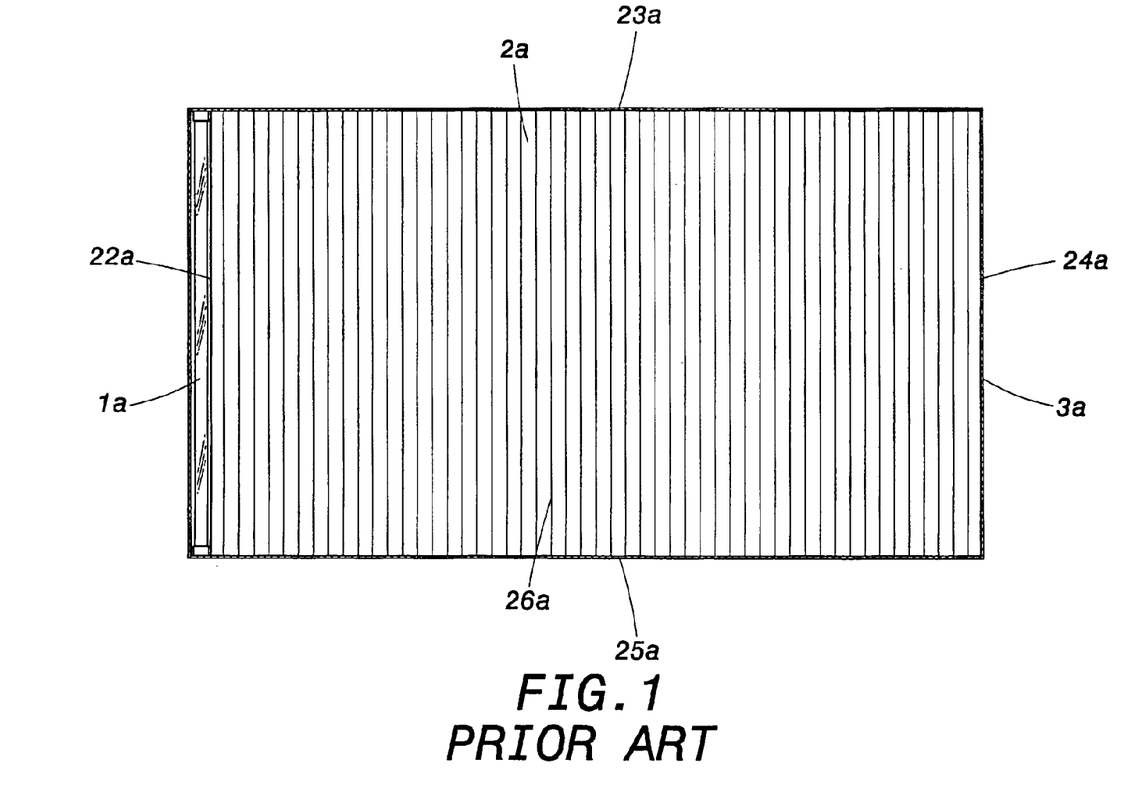
FIG. 1 is a plan view of a conventional light-guiding plate structure.
Figure 2:
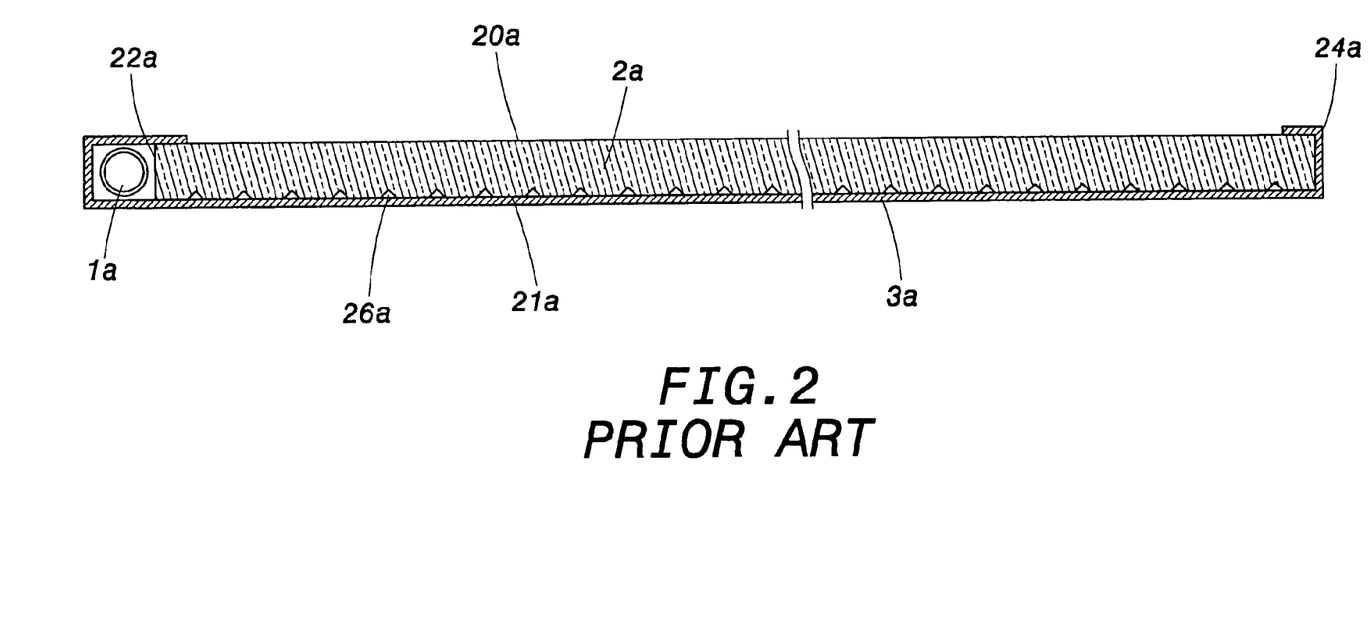
FIG. 2 is a cross-sectional side view of a conventional light-guiding plate structure.

As shown in FIGS. 1 and 2, a conventional light-guiding plate structure comprises a light source 1a, a light-guiding plate 2a, and a reflective component 3a. The top face of the light-guiding plate 2a is a light output face 20a. The bottom face of the light-guiding plate 2a is a reflective face 21a. A first side 22a, a second side 23a, a third side 24a, and a fourth side 25a adjoining one another in order are disposed at the periphery of the light-guiding plate 2a. The reflective face 21a has veins 26a parallel to the first side 22a. The light source 1a is disposed at the first side 22a. The reflective component 3a covers the second side 23a, the third side 24a, the fourth side 25a, and the reflective face 21a, and also sheathes the light source 1a between it and the light-guiding plate 2a.

Figure 3:
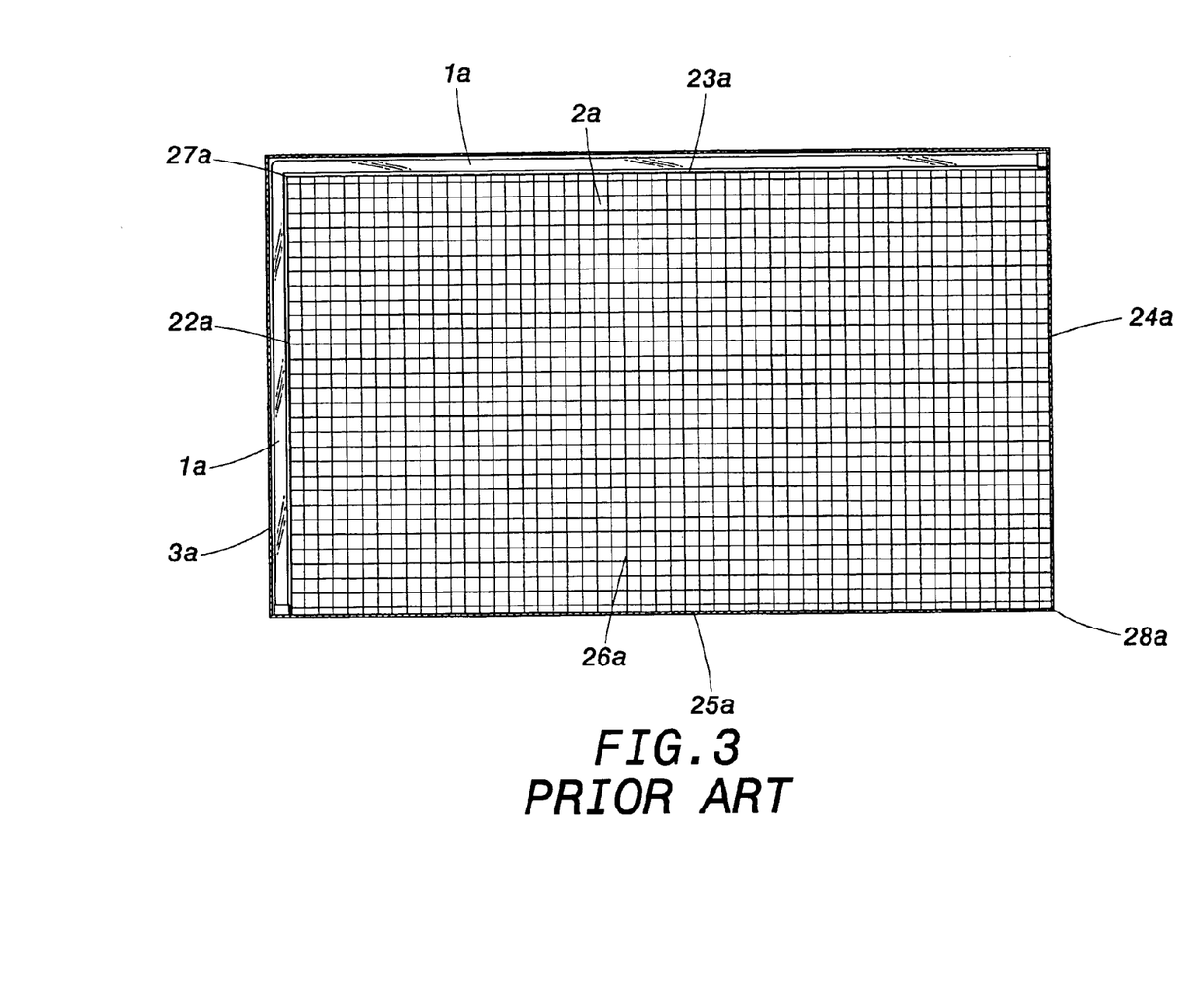
FIG. 3 is a plan view of another conventional light-guiding plate structure.

As shown in FIG. 3, the veins 26a of the reflective face 21a of the light-guiding plate 2a are parallel to the first side 22a and the second side 23a. The light source 1a is L-shaped and disposed at the first side 22a and second side 23a. The point of intersection of the first side 22a and the second side 23a is a first end point 27a. The point of intersection of the third side 24a and the fourth side 25a is a third end point 28a.

Light rays from the light source of the above conventional light-guiding plate structure shown in FIGS. 1 and 2 enter via the first side, are then reflected by the veins of the reflective face, and then project out from the light output face. Because the light source is disposed at the first side, the first side will be too bright while the third side will be darker so that the light rays at the light output face will be nonuniform. Moreover, as shown in FIG. 3, because the light source is disposed at the first side and the second side, the light output face near the first end point will be too bright while the light output face near the third end point will be darker so that the light rays at the light output face will be nonuniform.

Accordingly, the above conventional light-guiding plate structure has inconvenience and drawbacks in practical use. The present invention aims to resolve the problems in the prior art.

SUMMARY OF THE INVENTION

The primary object of the present invention is to provide a radial type light-guiding plate to let light rays at the light output face thereof be uniform and increase the brightness.

To achieve the above object, the present invention provides a radial type light-guiding plate, which comprises a light source, a light-guiding plate, and a reflective component. The top face of the light-guiding plate is a light output face. The bottom face of the light-guiding plate is a reflective face. The light source is disposed at sides of the light-guiding plate. The reflective face has channels, which radiate from the region away from the light source toward the sides near the light source. The reflective component covers the sides and the reflective face of the light-guiding plate, and also sheathes the light source between it and the light-guiding plate.

The various objects and advantages of the present invention will be more readily understood from the following detailed description when read in conjunction with the appended drawings, in which:

DETAILED DESCRIPTION OF THE PREFERRED EMBODIMENTS

Figure 4:
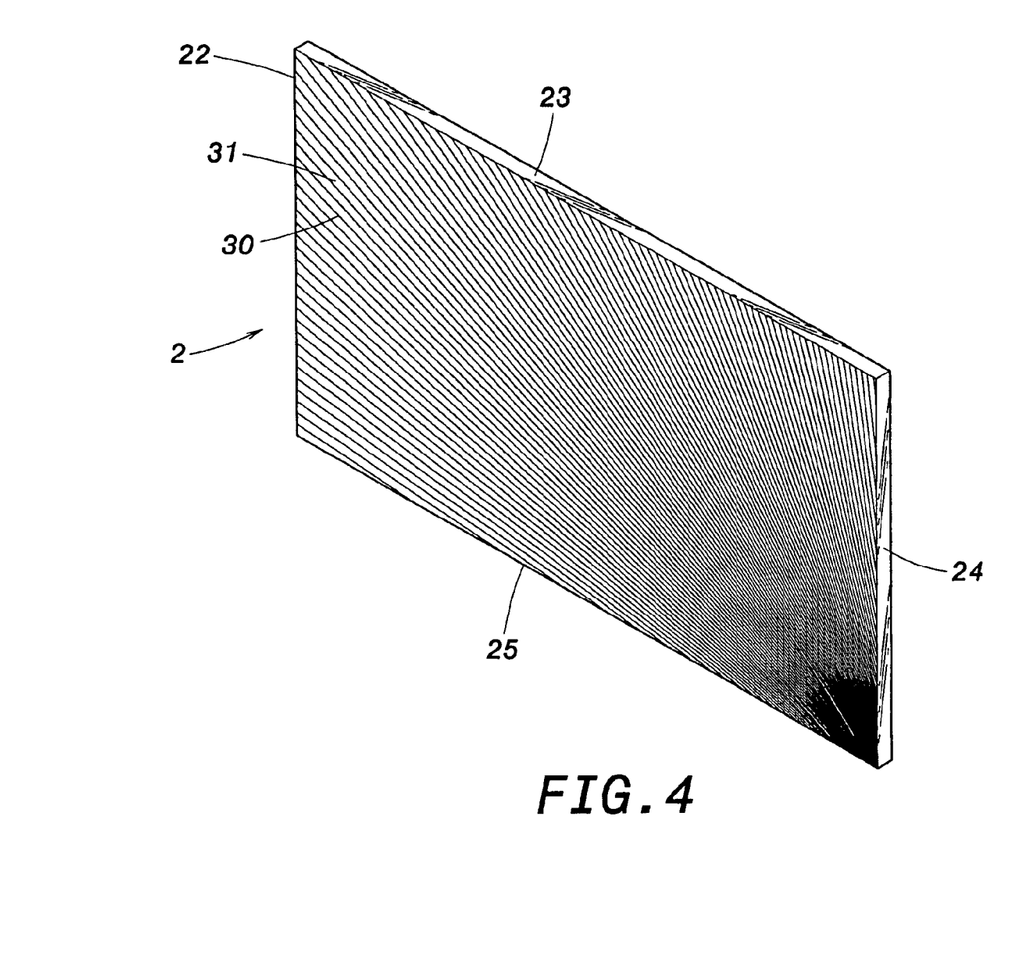
FIG. 4 is a perspective view of a light-guiding plate of the present invention.
Figure 5:
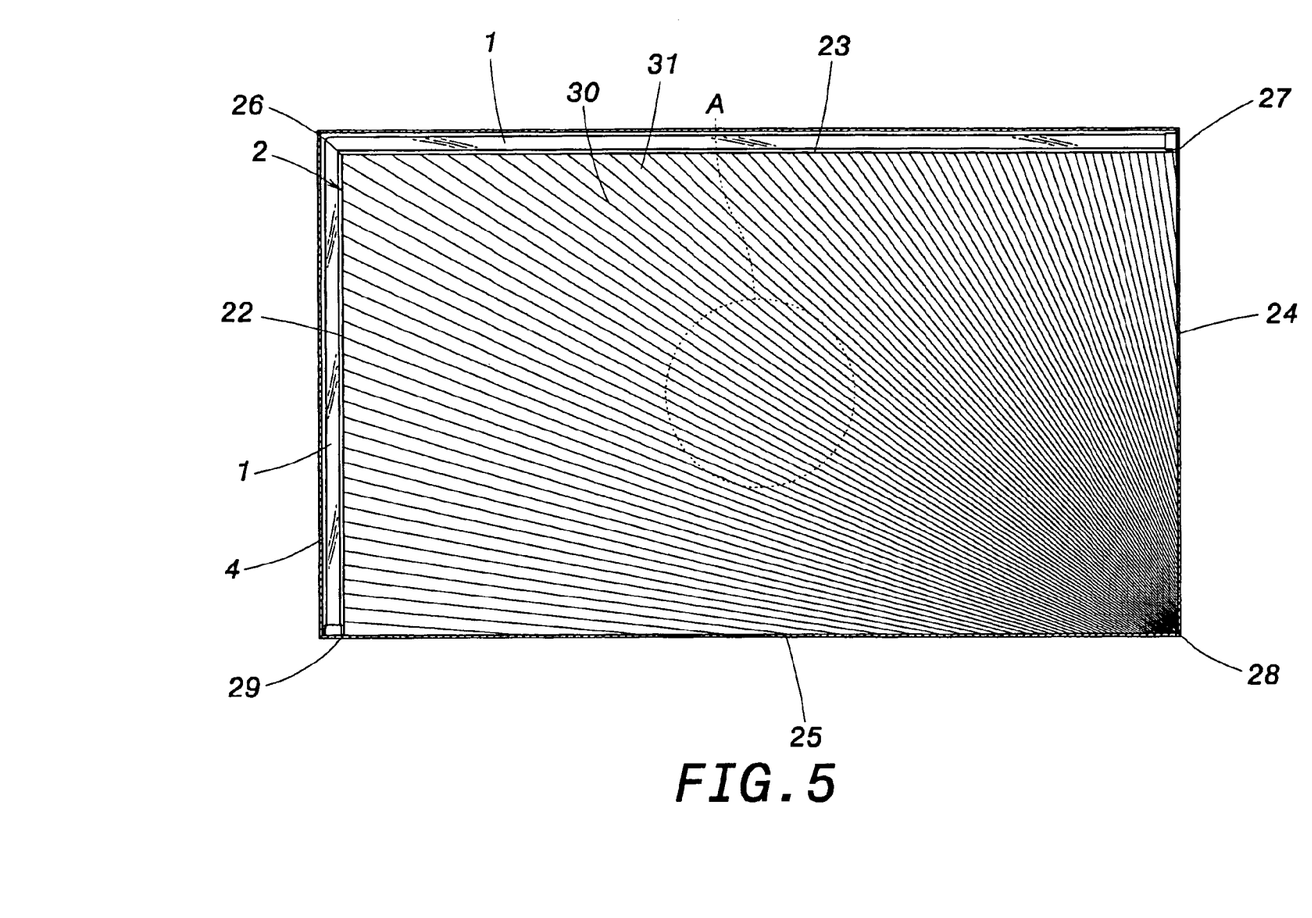
FIG. 5 is a plan view of a light-guiding plate structure according to a first embodiment of the present invention.
Figure 5A:
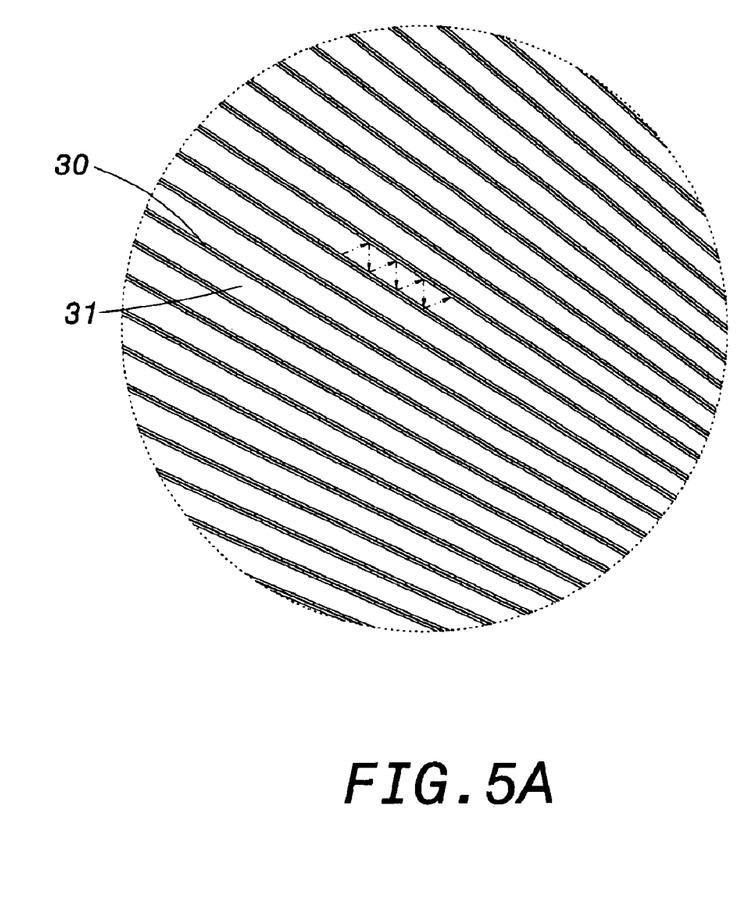
FIG. 5A is an enlarged view of part A shown in FIG. 5.
Figure 6:
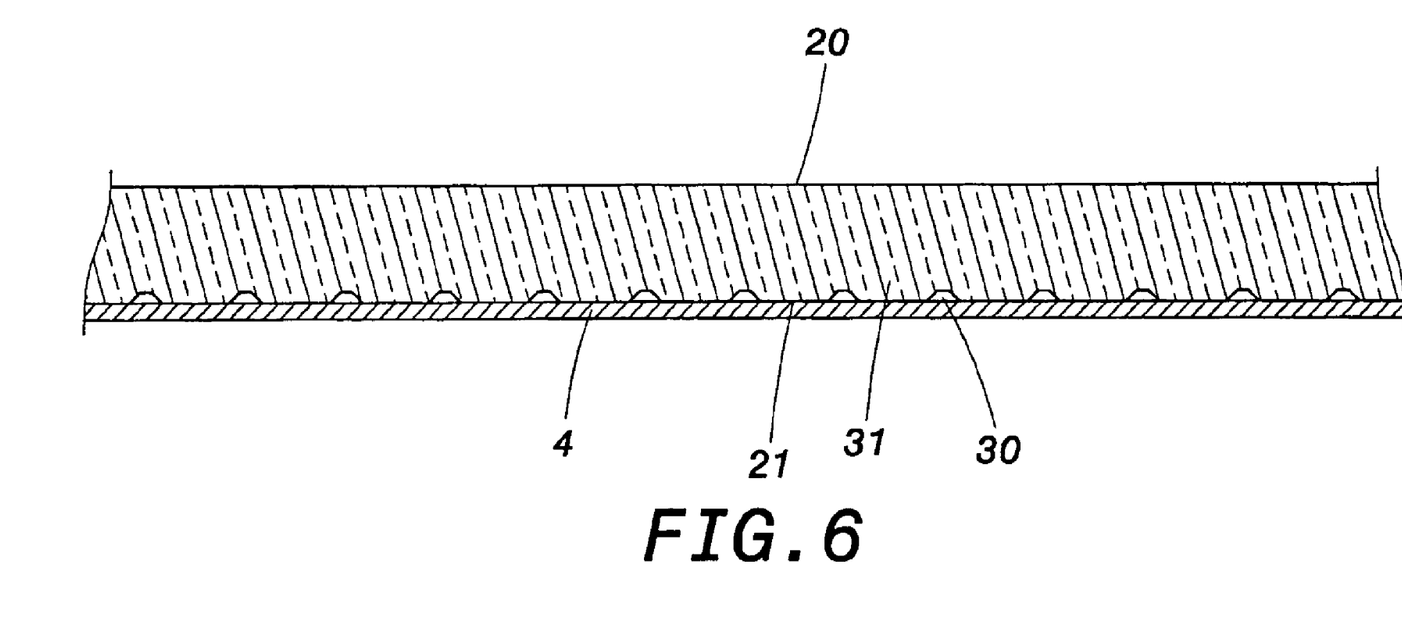
FIG. 6 is a partial cross-sectional view of a light-guiding plate structure of the present invention.

As shown in FIGS. 4 to 6, a radial type light-guiding plate of the present invention comprises a light source 1, a light-guiding plate 2, and a reflective component 4.

The light source 1 is L-shaped, and projects out light rays.

The top face of the light-guiding plate 2 is a light output face 20. The bottom face of the light-guiding plate 2 is a reflective face 21. A first side 22, a second side 23, a third side 24, and a fourth side 25 adjoining in order one another are disposed at the periphery of the light-guiding plate 2. The point of intersection of the first side 22 and the second side 23 is a first end point 26. The point of intersection of the second side 23 and the third side 24 is a second end point 27. The point of intersection of the third side 24 and the fourth side 25 is a third end point 28. The point of intersection of the fourth side 25 and the first side 22 is a fourth end point 29. The light source 1 is disposed at the first side 22 and the second side 23. The reflective face 21 has channels 30, which radiate from the fourth side 25 and the third side 24 far away from the light source 1 toward the first side 22 and the second side 23 near the light source 1. Light ray passageways 31 are formed between the channels 30. The start points of the channels are located at the fourth side 25 and the third side 24. The nearer to the third end point 28, the closer the channels are together. The spacing gradually increases toward the fourth end point 29 and the second end point 27. The stop points of the channels are located at the first side 22 and the second side 23. The nearer to the first end point 26, the further apart the channels. The spacing gradually decreases toward the fourth end point 29 and the second end point 27. The widths of the light ray passageways 31 gradually decrease from the first side 22 and the second side 23 toward the fourth side 25 and the third side 24. In other words, the channels 30 near the first end point 26 are spaced further apart, while the channels 30 near the third end point 28 are spaced further together. The light output face 20 can also have channels 30 corresponding to those of the reflective face 21.

The reflective component 4 covers the third side 24 and the fourth side 25 far away from the light source 1 and the reflective face 21, and also sheathes the light source 1 between it and the light-guiding plate 2. The reflective component simultaneously reflects light rays.

Light rays from the light source 1 enter the light-guiding plate 2 via the first side 22 and the second side 23, are reflected by the channels 30 of the reflective face 21, and then project out from the light output face 20. Because the channels 30 are radial, the channels 30 at the first end point 26 near the light source 1 are spaced further apart, and the widths of the light ray passageways 31 are larger then where the channels 30 are spaced closer together. Therefore, the reflected light rays in the range of the light-guiding plate 2 emitted near the first end point 26 will be less. In other words, although the first end point 26 is near the light source, the light emitted in that region will not be too bright. Because the channels 30 are radial, and not parallel or vertical to the light source 1, light rays can be transmitted to the third end point 28 far away from the light source 1. Because the channels 30 near the third end point 28 are closer together, light rays can be effectively transmitted thereto, hence enhancing the brightness and uniformity thereof.

Figure 7:
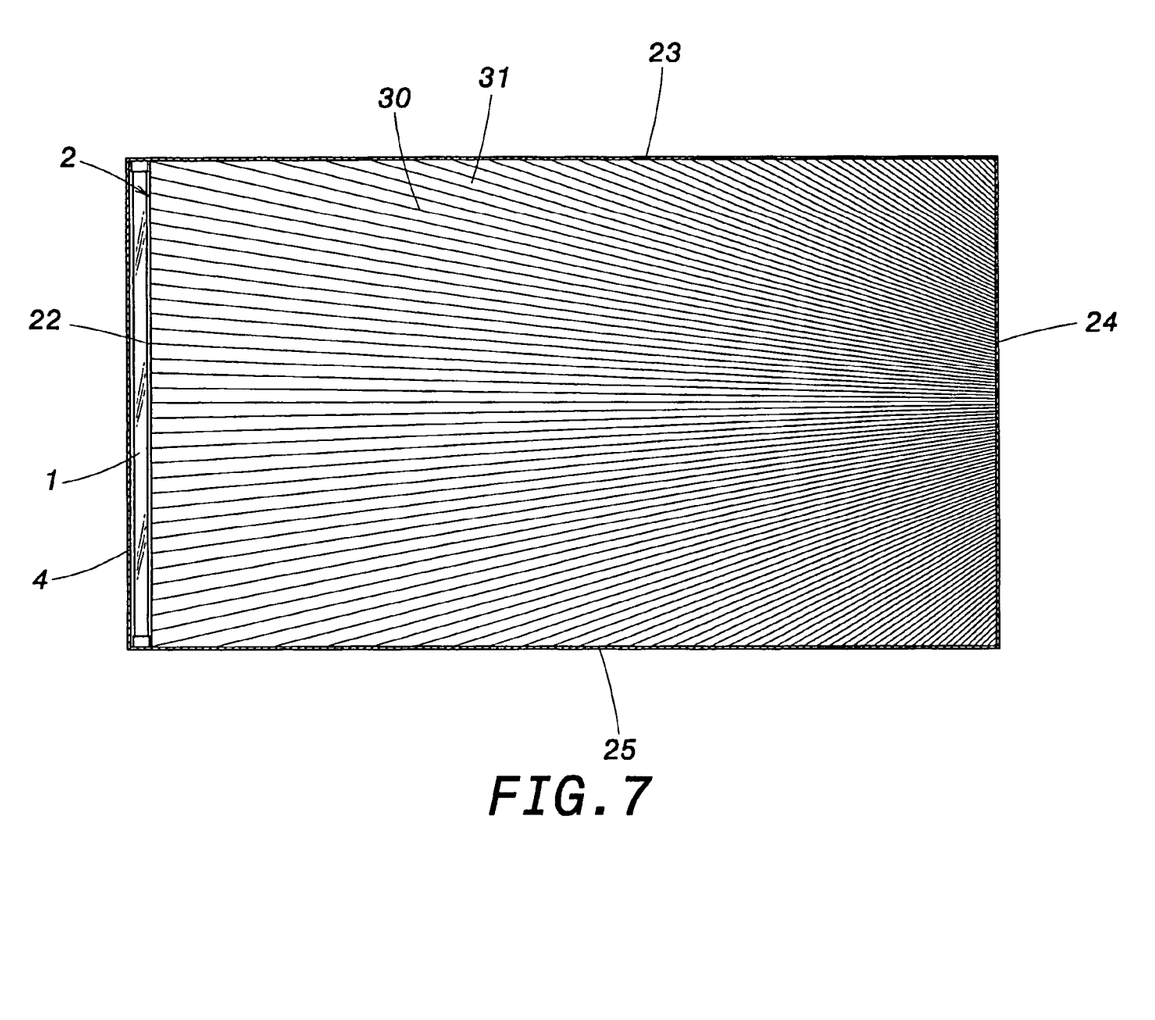
FIG. 7 is a plan view of a light-guiding plate structure according to a second embodiment of the present invention.

As shown in FIG. 7, the channels 30 radiate from the third side 24, far away from the light source 1 toward the first side 22 near the light source 1. The channels 30 near the first side 22 are spaced further apart than the third side 24. Reflected light rays emitted near the first side 22 will thus be less than where the channels 30 are closer together. Because the channels 30 near the third side 24 are closer together, light rays can be more effectively transmitted thereto, hence enhancing the brightness and uniformity thereof.

Figure 8:
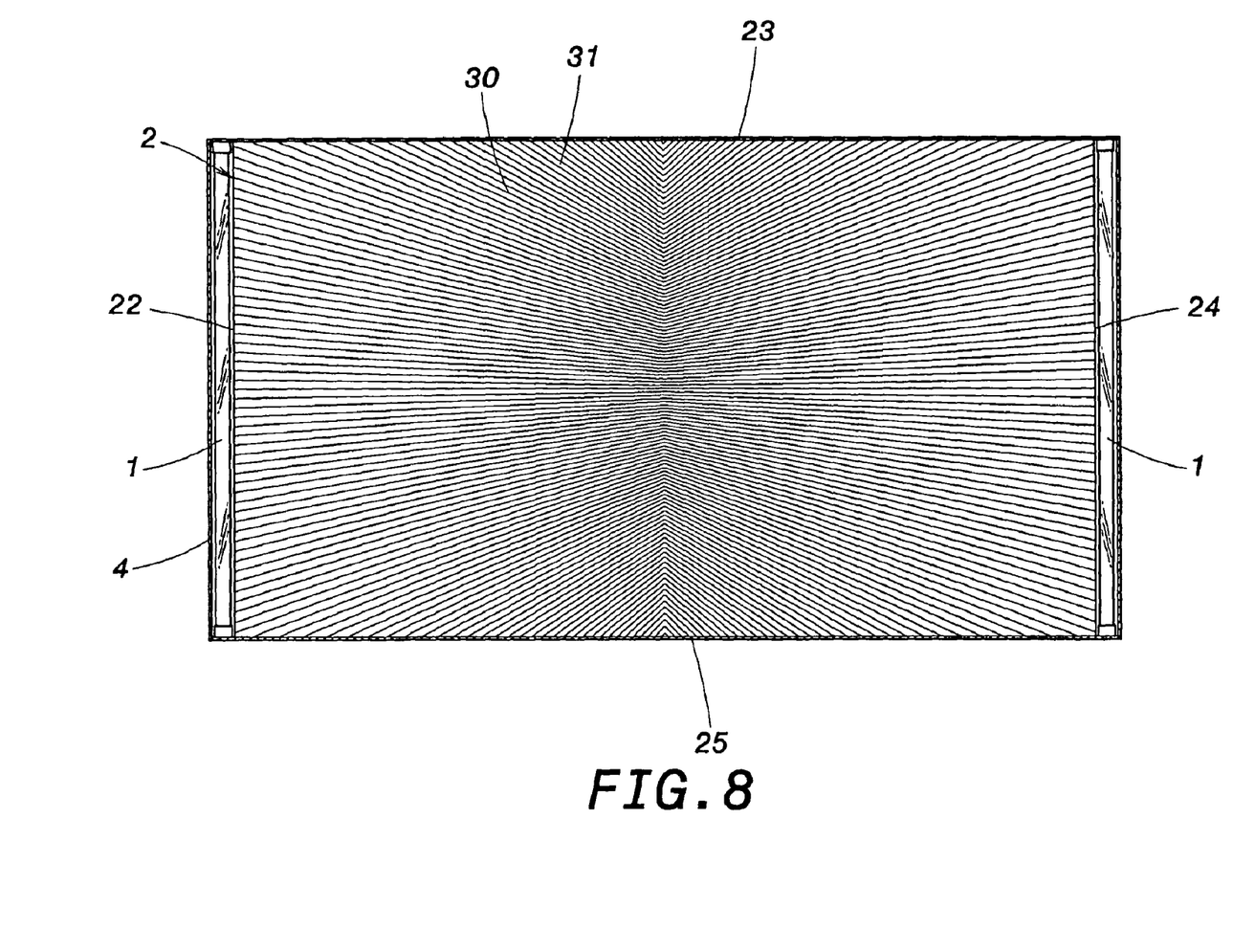
FIG. 8 is a plan view of a light-guiding plate structure according to a third embodiment of the present invention.

As shown in FIG. 8, the channels 30 radiate from the central region of the light-guiding plate 2 far away from the light source 1 toward the first side 22 and third side 24 near the light source 1. The channels 30 near the first side 22 and the third side 24 are are spaced further apart than those near the central region. Reflected light rays there will thus be less. Because the channels 30 near the central region of the light-guiding plate 2 are are spaced closer together, light rays can be more effectively transmitted thereto, hence enhancing the brightness and uniformity thereof.

To sum up, the radial type light-guiding plate of the present invention has the following characteristic.

The present invention is characterized in that the radial channels increase the brightness of the light-guiding plate far away from the light source so as to decrease the difference in brightness of emitted light therefrom with the emitted light of the light-guiding plate near the light source. Therefore, the brightness of the whole light output face of the light-guiding plate will be more uniform.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A radial type light-guiding plate comprising:
  a light source;
  a light-guiding plate having a light output face being a top face thereof, and a reflective face being a bottom face thereof, said light source being L-shaped and disposed at two adjacent sides of said light-guiding plate, said reflective face having a plurality of channels formed therein, the channels being disposed in a diverging radial pattern originating from a predetermined intersection point of two other adjacent sides of said light-guiding plate displaced from the light source and extending toward said light source, a space between each adjacent channel defining a light ray passageway; and
  a reflective component covering said reflective face of said light-guiding plate, said light source and remaining sides of said light-guiding plate.

2. The radial type light-guiding plate as claimed in claim 1, wherein said light-guiding plate has a first side, a second side adjacent said first side, a third side adjacent said second side and opposite said first side, and a fourth side adjacent said third side and opposite said second side, said light-guiding plate having a first end point disposed at an intersection of said first side and said second side, a second end point disposed at an intersection of said second side and said third side, a third end point disposed at an intersection of said third side and said fourth side, a fourth end point disposed at an intersection of said fourth side and said first side, said L-shaped light source being disposed adjacent said first side and said second side of said light-guiding plate, start points of said channels being located at said fourth side and said third side, the channels being closely spaced adjacent to said third end point, said channel spacing gradually increasing toward said first, second and fourth end points, the stop points of said channels being located at said first side and said second side.

3. The radial type light-guiding plate as claimed in claim 1, wherein said light source is disposed adjacent each of two opposing sides of said light-guiding plate, said channels diverging radially from a central portion of said light-guiding plate toward said opposing sides.

4. A radial type light-guiding plate comprising:
  a light source;
  a light-guiding plate having a light output face being a top face thereof, and a reflective face being a bottom face thereof, said reflective face having a plurality of channels formed therein, said light-guiding plate having a first side, a second side adjacent said first side, a third side adjacent said second side and opposite said first side, and a fourth side adjacent said third side and opposite said second side, said light-guiding plate having a first end point disposed at an intersection of said first side and said second side, a second end point disposed at an intersection of said second side and said third side, a third end point disposed at an intersection of said third side and said fourth side, a fourth end point disposed at an intersection of said fourth side and said first side, said light source being L-shaped and disposed adjacent said first side and said second side of said light-guiding plate, start points of said channels being located at said fourth side and said third side, the channels being closely spaced adjacent to said third end point, said channel spacing gradually increasing toward said first, second and fourth end points, the stop points of said channels being located at said first side and said second side, the channels being disposed in a diverging radial pattern originating from a portion of said light-guiding plate displaced from the light source and extending toward said light source, a space between each adjacent channel defining a light ray passageway; and a reflective component covering said reflective face of said light-guiding plate, said light source and remaining sides of said light-guiding plate.

* * * * *